(12) United States Patent
Hennigan et al.

(10) Patent No.: US 11,187,914 B2
(45) Date of Patent: Nov. 30, 2021

(54) MIRROR-BASED SCENE CAMERAS

(71) Applicant: Apple Inc., Cupertino, CA (US)

(72) Inventors: Daniel R. Hennigan, Livermore, CA (US); Noah D. Bedard, Pacifica, CA (US); Branko Petljanski, San Jose, CA (US); Jason C. Sauers, Sunnyvale, CA (US); Edward S. Huo, Sunnyvale, CA (US); Ricardo J. Motta, Palo Alto, CA (US); Brett D. Miller, Redwood City, CA (US); Yury Petrov, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 16/583,193

(22) Filed: Sep. 25, 2019

(65) Prior Publication Data

US 2020/0103669 A1    Apr. 2, 2020

Related U.S. Application Data

(60) Provisional application No. 62/739,092, filed on Sep. 28, 2018.

(51) Int. Cl.
| | | |
|---|---|---|
| *G02B 27/14* | (2006.01) | |
| *G02B 27/01* | (2006.01) | |
| *G02B 5/08* | (2006.01) | |
| *G02B 30/35* | (2020.01) | |

(52) U.S. Cl.
CPC ............ *G02B 27/14* (2013.01); *G02B 5/0808* (2013.01); *G02B 27/0172* (2013.01); *G02B 30/35* (2020.01); *G02B 2027/0123* (2013.01)

(58) Field of Classification Search
CPC ............. G02B 27/14; G02B 27/0172; G02B 27/0123; G02B 30/35; G02B 30/34; G02B 5/0808; G02B 5/08
USPC ........................................................ 359/851
See application file for complete search history.

(56) References Cited

U.S. PATENT DOCUMENTS

| | | | |
|---|---|---|---|
| 9,813,673 B2 | 11/2017 | Smits | |
| 9,977,248 B1 | 5/2018 | Xie et al. | |
| 10,352,693 B2* | 7/2019 | Abovitz | A63F 13/213 |
| 10,466,478 B2 | 11/2019 | Klug et al. | |
| 10,652,438 B2* | 5/2020 | Wippermann | H04N 5/3415 |
| 10,996,460 B2* | 5/2021 | Wippermann | G02B 26/0816 |

(Continued)

FOREIGN PATENT DOCUMENTS

| | | |
|---|---|---|
| EP | 3229073 | 10/2017 |
| WO | 2017139871 | 8/2017 |

OTHER PUBLICATIONS

International Search Report and Written Opinion from PCT/US2019/083631, (Apple Inc.), dated Nov. 29, 2019, pp. 1-12.

(Continued)

*Primary Examiner* — William R Alexander
(74) *Attorney, Agent, or Firm* — Robert C. Kowert; Kowert, Hood, Munyon, Rankin & Goetzel, P.C.

(57) ABSTRACT

A scene camera system that includes two or more mirrors that reflect light from a respective portion of a field of view (FOV) in front of the system and two or more cameras that each capture the light reflected by a respective one of the two or more mirrors. By using the mirrors to reflect the light, the cameras' entrance pupils are imaged to a location closer to a user's eyes to thus achieve a more accurate representation of the perspective of the user.

21 Claims, 7 Drawing Sheets

(56) References Cited

U.S. PATENT DOCUMENTS

| | | |
|---|---|---|
| 2004/0238732 A1 | 12/2004 | State et al. |
| 2006/0114332 A1 | 6/2006 | Yoshikawa |
| 2007/0091195 A1 | 4/2007 | Yoshikawa |
| 2015/0247723 A1* | 9/2015 | Abovitz ............. G06K 9/00664 356/600 |
| 2016/0147045 A1 | 5/2016 | Masuda et al. |
| 2017/0078653 A1 | 3/2017 | Bi et al. |
| 2017/0214863 A1 | 7/2017 | Narabu |
| 2018/0003999 A1* | 1/2018 | Minano .............. G02B 27/0172 |
| 2018/0128685 A1 | 5/2018 | Peloux et al. |
| 2018/0241920 A1 | 8/2018 | Wippermann et al. |
| 2018/0324334 A1* | 11/2018 | Wippermann ....... H04N 5/2253 |
| 2019/0371028 A1 | 12/2019 | Harrises et al. |
| 2020/0033588 A1* | 1/2020 | Wippermann ....... H04N 5/2254 |

OTHER PUBLICATIONS

U.S. Appl. No. 17/276,476, filed Mar. 15, 2021, Noah D. Bedard et al.

* cited by examiner

MIRROR-BASED SCENE CAMERAS

PRIORITY INFORMATION

This application claims benefit of priority of U.S. Provisional Application Ser. No. 62/739,092 filed Sep. 28, 2018, the content of which is incorporated by reference herein in its entirety.

BACKGROUND

Virtual reality (VR) allows users to experience and/or interact with an immersive artificial environment, such that the user may feel as if they were physically in that environment. For example, virtual reality systems may display stereoscopic scenes to users in order to create an illusion of depth, and a computer may adjust the scene content in real-time to provide the illusion of moving within the scene. When a user views images through a virtual reality system, the user may thus feel as if they are moving within the scenes from a first-person point of view. Mixed reality (MR) covers a spectrum from augmented reality (AR) systems that combine computer generated information (referred to as virtual content) with views of the real world to augment, or add virtual content to, a user's view of their real environment (referred to as), to augmented virtuality (AV) systems that combine representations of real world objects with views of a computer generated three-dimensional (3D) virtual world. The simulated environments of virtual reality systems and/or the mixed environments of mixed reality systems may thus be utilized to provide an interactive user experience for multiple applications, such as applications that add virtual content to a real-time view of the viewer's environment, applications that generate 3D virtual worlds, interacting with virtual training environments, gaming, remotely controlling drones or other mechanical systems, viewing digital media content, interacting with the Internet, exploring virtual landscapes or environments, or the like.

SUMMARY

Various embodiments of scene cameras are described. The scene cameras may, for example, be used in video see-through devices in mixed reality (MR) or virtual reality (VR) systems. In conventional video see-through devices, one or more scene cameras may be mounted at the front of the device. However, typically the entrance pupil and thus the point of view (POV) of the scene cameras is substantially offset from and thus substantially different than the POV of the user's eyes. Embodiments of scene camera configurations are described that at least partially correct the POV of the cameras to more closely match the POV of a user by imaging the entrance pupils of the cameras at a location closer to the user's eyes.

In embodiments, a scene camera system may include mirrors and cameras that capture light from the scene reflected by the mirrors. By using the mirrors to reflect the light, the cameras' entrance pupils are imaged at a location closer to a user's eyes to thus achieve a more accurate representation of the perspective of the user. In some embodiments, there are two mirrors arranged horizontally, with a first (top) mirror that reflects light from an upper region of the FOV to one or more cameras, and a second (bottom) mirror that reflects light from a lower region of the FOV to one or more cameras. The two mirrors may be straight, curved, or segmented. In some embodiments, there may be two cameras for each eye, with one that captures light reflected by the top mirror, and a second that captures light reflected by the bottom mirror. However, more or fewer cameras and/or mirrors may be used.

Figure 1:
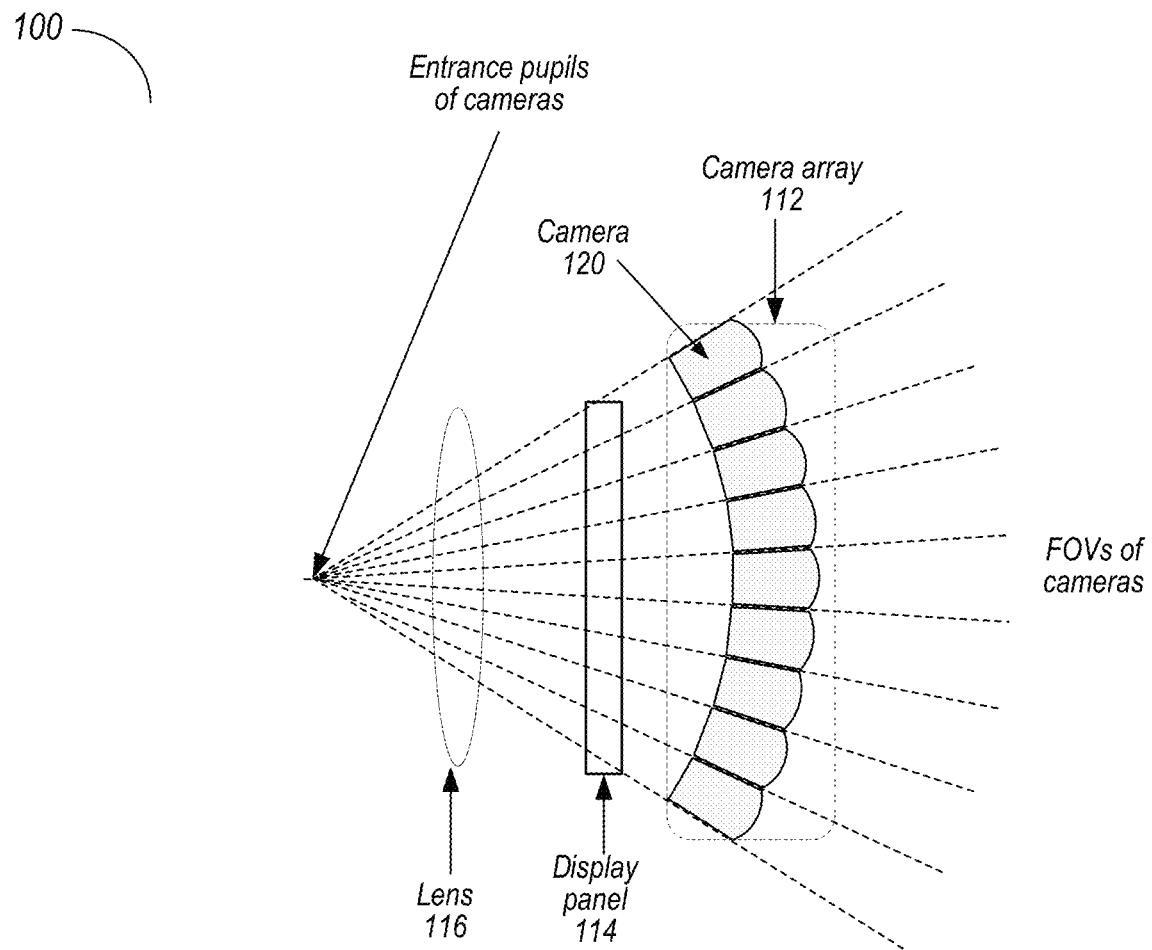
FIG. 1 illustrates an array of cameras with entrance pupils at or near a user's eye, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of scene camera systems are described. Embodiments of a system are described that include mirrors and cameras that capture light from the scene reflected by the mirrors. By using the mirrors to reflect the light, the cameras' entrance pupils are imaged to a location closer to a user's eyes to thus achieve a more accurate representation of the perspective of the user. The scene camera systems may, for example, be used in mixed reality (MR) or virtual reality (VR) systems such as video see-through head-mounted displays (HMDs)

In conventional MR/VR systems that include HMDs, one or more scene cameras may be mounted at the front of the HMD that capture images of the real-world scene in front of a user; the images are processed and displayed to display panels of the HMD. However, typically the entrance pupil and thus the point of view (POV) of these conventional scene cameras is substantially offset from and thus different than the POV of the user's eyes. Embodiments of scene camera configurations that may, for example, be used in HMDs are described that at least partially correct the POV of the cameras to match the POV of the user by causing the entrance pupils of the cameras to be imaged at a location closer to the user's eyes. Thus, the scene cameras may capture images of the environment from substantially the same perspective as the user's eyes.

FIG. 1 illustrates an example system 100 that includes an array 112 of cameras 120. The system 100 may include one or more display panels 114 (e.g., one display panel 114 for each eye) and one or more lenses 116 (e.g., one lens 116 for each eye) through which a user views images displayed on the display panels 114. The system 100 may include two camera arrays 112 (one array 112 for the left eye, and a second array 112 for the right eye). Each camera 120 in an array 112 captures images of a respective portion of a real-world scene in front of the system 100. To achieve a more accurate representation of the perspective of the user, the cameras' optics are configured so that the entrance pupils of the cameras 120 in the array 112 are positioned behind the image planes formed at the camera sensors and thus closer to the user's eye.

In embodiments as illustrated in FIG. 1, to capture a sufficiently wide field of view (FOV) for each eye (e.g., 90-140 degrees on the horizontal axis and on the vertical axis), a two-dimensional array 112 that includes many small form factor cameras 120 each with a relatively narrow FOV (e.g., 10-15 degrees) may be used for each eye. Thus, each array 112 may include many cameras 120 (e.g., 50-100 cameras per eye).

As an alternative to using arrays of cameras to capture the full FOV as described above in reference to FIG. 1, embodiments of a system are described that include mirrors and cameras that capture light from the scene reflected by the mirrors. By using the mirrors to reflect the light, the cam- eras' entrance pupils are imaged to a location closer to a user's eyes to thus achieve a more accurate representation of the perspective of the user. In some embodiments, there are two mirrors arranged horizontally, with a first (top) mirror that reflects light from an upper region of the FOV to one or more cameras, and a second (bottom) mirror that reflects light from a lower region of the FOV to one or more cameras. The two mirrors may be straight, curved, or segmented. In some embodiments, there may be two cameras for each eye, with one that captures light reflected by the top mirror, and a second that captures light reflected by the bottom mirror. However, more or fewer cameras and/or mirrors may be used. Thus, embodiments may reduce the number of cameras needed to capture the full FOV when compared to a system as shown in FIG. 1.

Figure 2A:
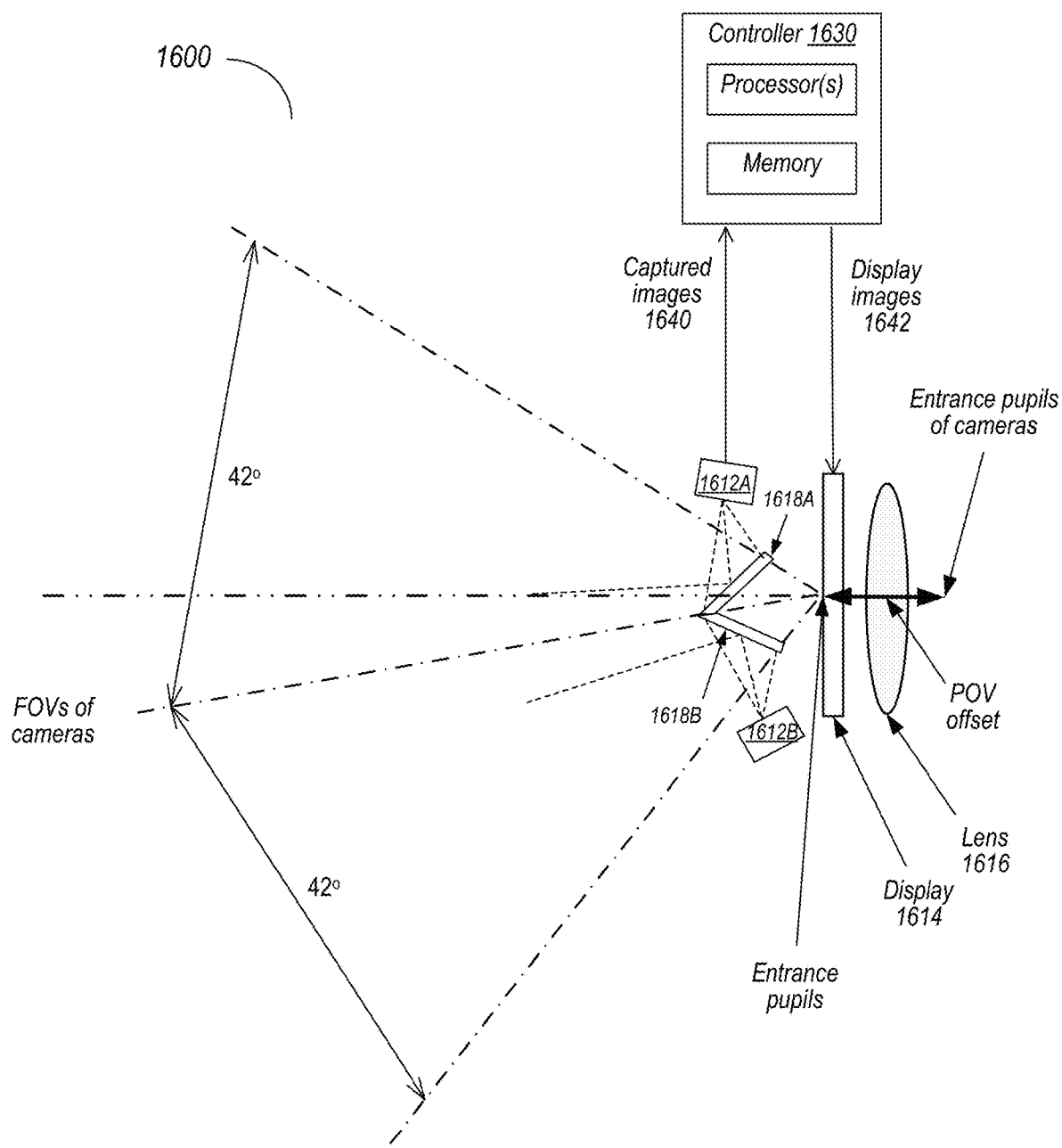
FIGS. 2A and 2B illustrate a system in which mirrors and multiple cameras cause the camera's entrance pupils to be imaged at a location closer to a user's eyes, according to some embodiments.
Figure 2B:
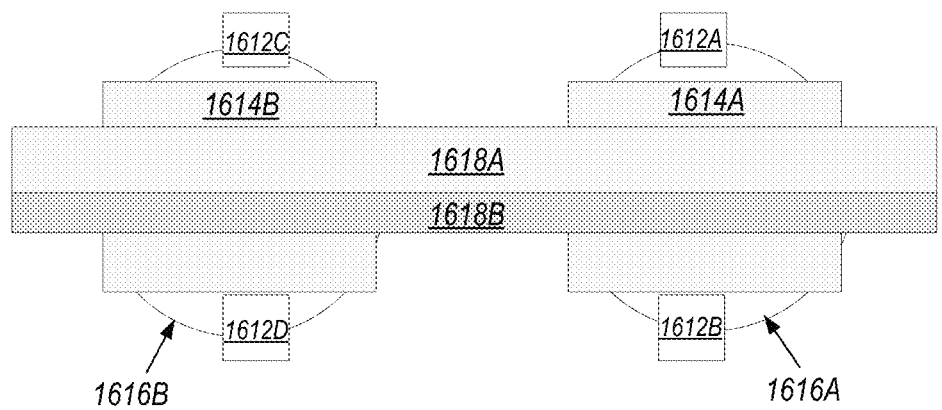

FIGS. 2A and 2B illustrate a system 1600 that includes mirrors and multiple cameras that cause the camera's entrance pupils to be imaged at a location closer to a user's eyes, according to some embodiments. The system 1600 may, for example, be implemented in an HMD of an MR/VR system. FIG. 2A shows a cutaway view of the system 1600 from the left side, and FIG. 2B shows a front view of the system 1600. The system 1600 may include one or more display panels 1614 (e.g., one display panel 1614 for each eye) and one or more lenses 1616 (e.g., one lens 1616 for each eye) through which the user views images displayed on the display panels 1614. System 1600 also includes a controller 1630 comprising one or more processors and memory that is coupled to the cameras 1612 and to the display panels 1614 via wired or wireless interfaces. The controller 1630 may be integrated in a device that includes the scene camera system (e.g., an HMD), or alternatively may be a component of a separate device or base station that communicates with the device via one or more wired or wireless interfaces. The controller 1630 may be or may include an FPGA (field programmable gate array), an ISP (image signal processor), an SOC (system on a chip), or other appropriate technology.

Figure 3:
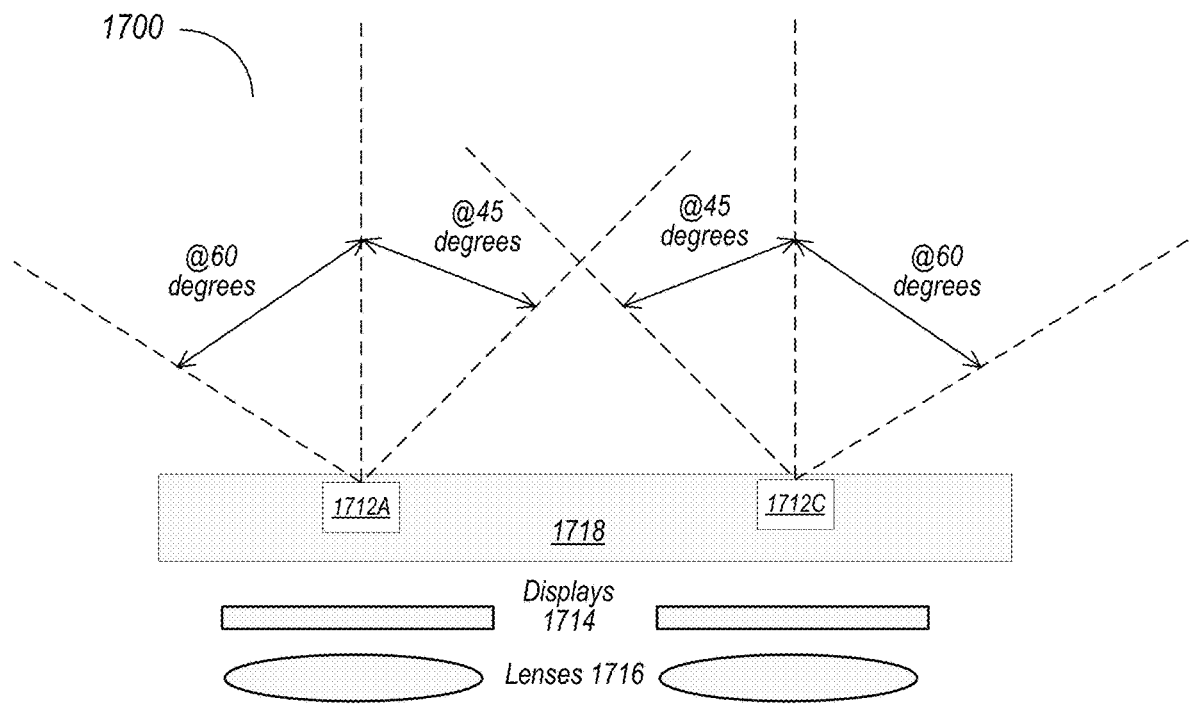
FIG. 3 illustrates using straight mirrors in a scene camera system, according to some embodiments.

The system 1600 may include two horizontally oriented mirrors 1618A and 1618B that extend across the front of the system 1600 to reflect light from the FOV of the system 1600 to cameras 1612A-1612D. Mirror 1618A may be tilted to reflect light from a top portion of the FOV to top cameras 1612A and 1612C that capture images of the top portion of the FOV, and mirror 1618B may be tilted to reflect light from a bottom portion of the FOV to bottom cameras 1612B and 1612D that capture images of the bottom portion of the FOV. The two mirrors 1618A and 1618B may connect at a front edge, and may be tilted downwards with respect to a center axis of the system 1600 as shown in FIG. 2A. In this example, each mirror 1618 covers between 40 and 50 degrees (e.g., 42 degrees) of the FOV in the vertical direction. Cameras 1612A and 1612B capture images of the left portion of the FOV, and cameras 1612C and 1612D capture images of the right portion of the FOV. In an example embodiment, cameras 1612A and 1612B each cover a FOV that extends about 60 degrees towards the left and about 45 degrees towards the center, and cameras 1612C and 1612D each cover a FOV that extends about 60 degrees towards the right and 45 degrees towards the center, as shown in FIG. 3. Thus, in some embodiments, the scene camera may cover about 84 degrees in the vertical direction and about 120 degrees in the horizontal direction. However, wider or narrower FOVs may be provided in some embodiments. The FOV of camera 1612A may, but does not necessarily, overlap with the FOV of camera 1612C, and the FOV of camera 1612B may, but does not necessarily, overlap with the FOV of camera 1612D. However, in some embodiments, the FOV of camera 1612A does not overlap with the FOV of camera 1612B, and the FOV of camera 1612C does not overlap with the FOV of camera 1612D.

As shown in FIG. 2A, using mirrors 1618 to reflect light from the FOV to the cameras 1612 allows the entrance pupils of the cameras 1612 to be imaged closer to a user's eye than in a conventional front-facing camera, thus at least partially correcting the POV for the cameras 1612. For example, in some embodiments, the POV of cameras 1612 may be offset from the user's eyes 1690 by 30 millimeters or less, for example by 25 millimeters.

While FIGS. 2A and 2B show two cameras 1612 (a top and bottom camera) per eye, in some embodiments more cameras (e.g. four, two top and two bottom cameras 1612) may be used per eye.

The images 1640 captured by the cameras 1612 are sent to the controller 1630. The captured images 1640 are processed by one or more image processing pipelines of the controller 1630 to generate composite left and right images 1642 of the scene that are displayed to respective left and right display panels 1614 of the system 1600. A user views the displayed images through respective left and right lenses 1616 of the system 1600.

FIG. 3 illustrates using flat, straight mirrors in a scene camera system, according to some embodiments. FIG. 3 shows a top view of system 1700 that includes left and right displays 1714, left and right lenses 1716, flat mirrors 1718, left top camera 1712A, and right top camera 1712C. To provide a sufficiently wide FOV, the flat mirrors 1718 may need to be quite long in the horizontal direction, which requires the system 1700 to be large enough to accommodate the mirrors 1718.

Figure 4:
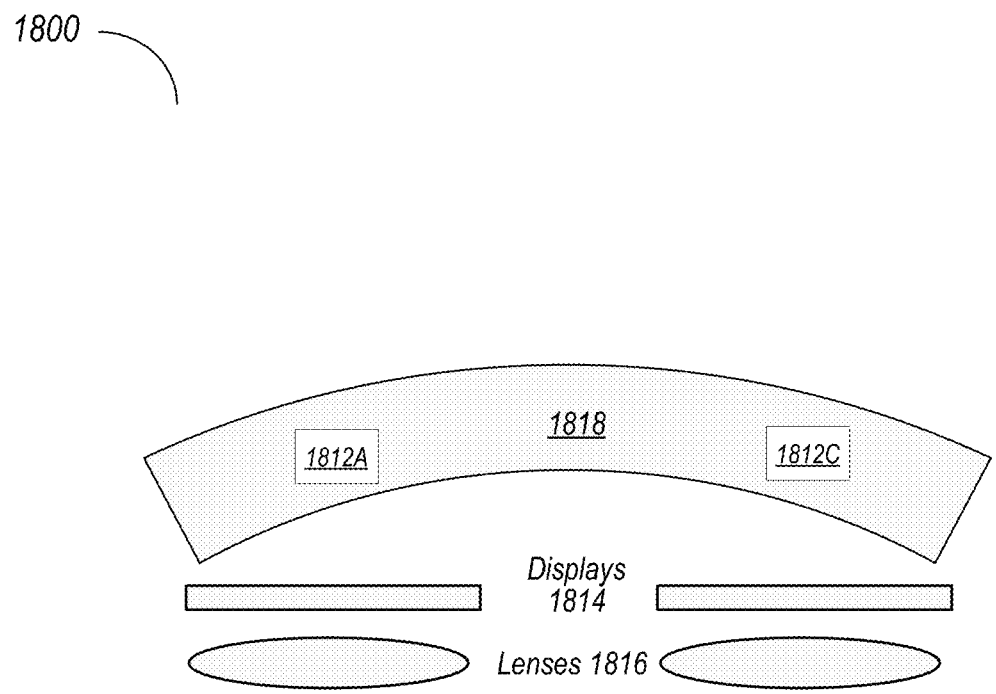
FIG. 4 illustrates using curved mirrors in a scene camera system, according to some embodiments.

FIG. 4 illustrates using curved mirrors in a scene camera system, according to some embodiments. FIG. 4 shows a top view of a system 1800 that includes left and right displays 1814, left and right lenses 1816, curved mirrors 1818, left top camera 1812A, and right top camera 1812C. In some embodiments, the mirrors 1818 are curved in the horizontal dimension as shown in FIG. 4. The curved mirrors 1818 may provide a wider FOV than the flat mirrors 1718 shown in FIG. 3. Further, the curved mirrors 1818 may be shorter in the horizontal direction while providing the same or a wider FOV than flat mirrors 1718, which may allow the system 1800 to be more compact than with a flat, straight mirror. In some embodiments, the mirrors 1818 may instead or also be curved in the vertical dimension, which may allow the mirrors 1818 to be more compact in the vertical dimension than flat mirrors.

Figure 5:
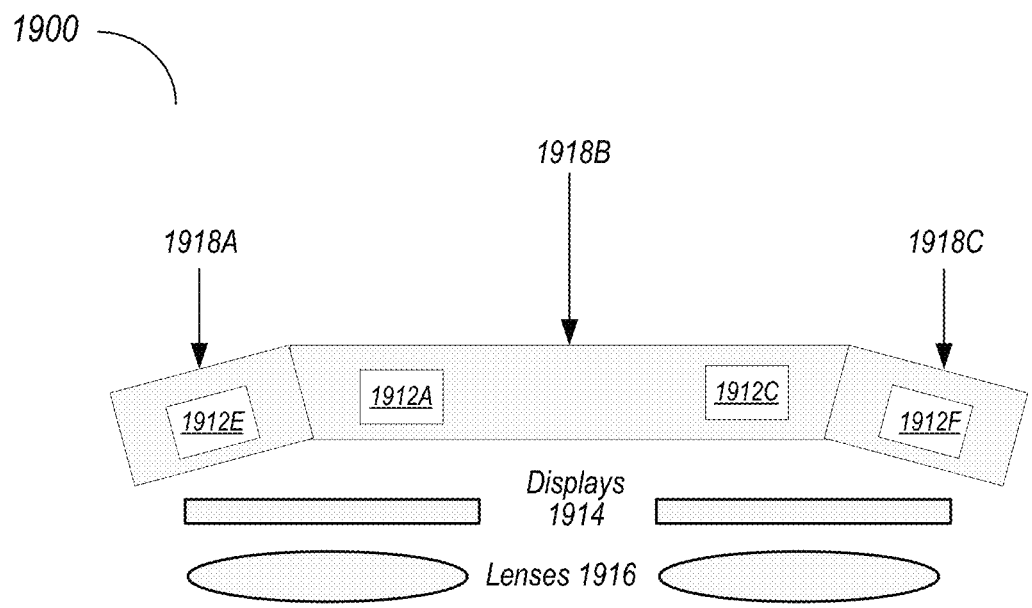
FIG. 5 illustrates using segmented mirrors in a scene camera system, according to some embodiments.

FIG. 5 illustrates using segmented mirrors in a scene camera system, according to some embodiments. FIG. 4 shows a top view of a system 1900 that includes left and right displays 1914 and left and right lenses 1916. Instead of top and bottom straight or curved mirrors as shown in FIGS. 4 and 5, scene camera system 1900 includes segmented top and bottom mirrors, with the top mirror including left mirror 1918A, center mirror 1918B, and right mirror 1918C (the bottom mirror includes three corresponding mirrors). Cameras 1912A and 1912C capture center portions of the FOV reflected by center mirror 1918B. Cameras 1912E and 1912F capture peripheral portions of the FOV reflected by left mirrors 1918A and 1918C, respectively. The segmented mirrors 1918 may provide a wider FOV than the flat mirrors 1718 shown in FIG. 3. Further, the segmented mirrors 1918 may be shorter in the horizontal direction while providing the same or a wider FOV than flat mirrors 1718, which may allow the system 1900 to be more compact than with a flat, straight mirror.

In some embodiments, the scene camera systems shown in any of FIGS. 2A-2B, 3, 4, and 5 may be implemented in a head-mounted display (HMD), for example an HMD of a MR/VR system. However, embodiments of the scene camera systems as described herein or variations thereof may be implemented in other devices or systems.

Figure 6:
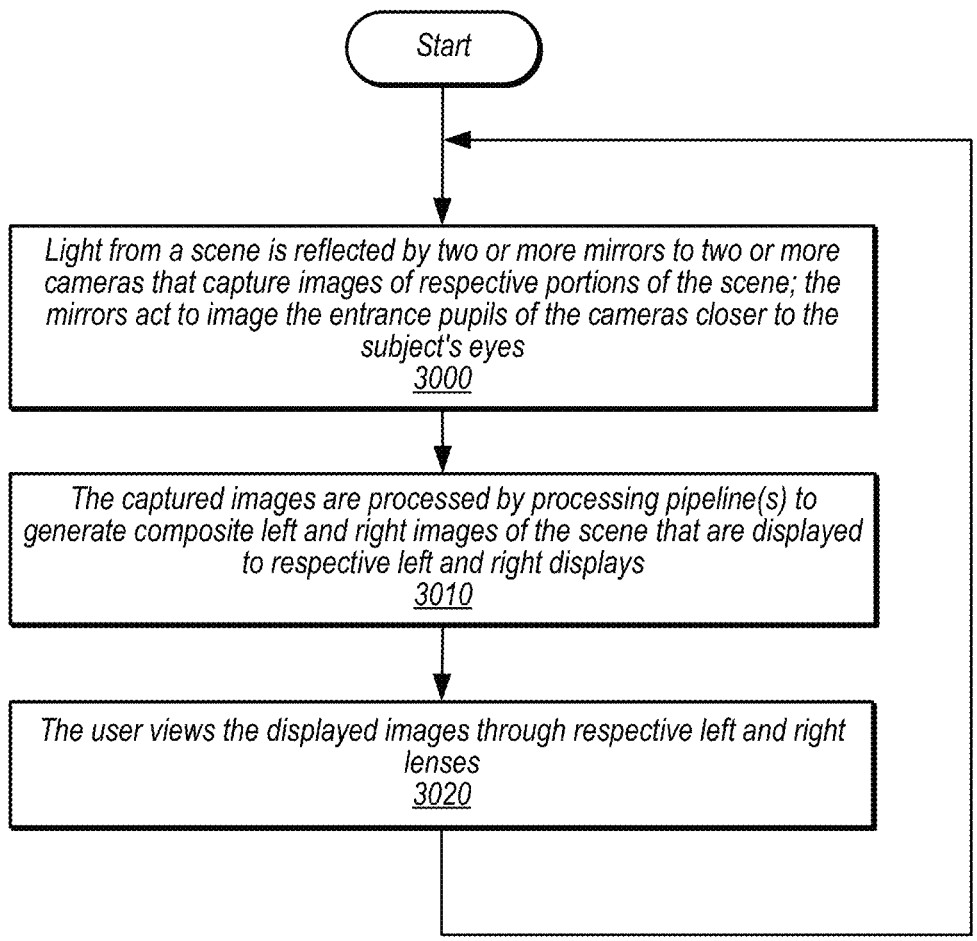
FIG. 6 is a high-level flowchart of a method of operation for a scene camera system as described herein, according to some embodiments.

FIG. 6 is a high-level flowchart of a method of operation for a scene camera system as illustrated in FIGS. 2A through 5, according to some embodiments. As indicated at 3000, light from a scene is reflected by two or more mirrors to two or more cameras that capture images of respective portions of the scene; the mirrors act to image the entrance pupils of the cameras closer to the subject's eyes. The images captured by the cameras are sent to a controller. As indicated at 3010, the captured images are processed by one or more image processing pipelines of the controller to generate composite left and right images of the scene that are displayed to respective left and right display panels. As indicated at 3020, a user views the displayed images through respective left and right lenses. In some embodiments, the mirrors, cameras, and display panels may be components of a head-mounted display (HMD), for example an HMD of a MR/VR system. The controller may be a component of the HMD or alternatively may be a component of a device or base station that communicates with the HMD via one or more wired or wireless interfaces.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   two or more mirrors, wherein each mirror is configured to reflect light from a respective portion of a field of view (FOV) of a scene in front of the mirrors; and
   two or more cameras facing the two or more mirrors, wherein each camera is configured to capture light reflected by a respective one of the two or more mirrors and form an image of a respective portion of the FOV at an image plane at or near a surface of an image sensor,
   wherein a first mirror is tilted towards a first camera and a second mirror is tilted towards a second camera, and wherein the first and second cameras are located at opposite sides of the mirrors.

2. The system as recited in claim 1, further comprising a controller configured to:
obtain captured images of respective portions of the FOV from the two or more cameras; and
process the captured images to generate at least one composite image of the scene for display.

3. The system as recited in claim 1, wherein the two or more mirrors comprise two horizontally oriented mirrors.

4. The system as recited in claim 3, wherein a first horizontally oriented mirror is tilted to reflect light from a top portion of the FOV to one or more of the cameras that capture images of a top portion of the FOV, and wherein a second horizontally oriented mirror is tilted to reflect light from a bottom portion of the FOV to one or more of the cameras that capture images of a bottom portion of the FOV.

5. The system as recited in claim 3, wherein the system comprises at least four cameras facing the two horizontally oriented mirrors, with at least two cameras facing the first mirror to capture left and right portions of the top portion of the FOV, and at least two cameras facing the second mirror to capture left and right portions of the bottom portion of the FOV.

6. The system as recited in claim 5, wherein the FOV of at least one of the cameras overlaps with the FOV of at least one other of the cameras.

7. The system as recited in claim 3, wherein the two mirrors connect at a front edge, and are tilted downwards with respect to a center axis of the system.

8. The system as recited in claim 3, wherein each mirror covers between 40 and 50 degrees of the FOV in the vertical direction.

9. The system as recited in claim 3, wherein the two horizontally oriented mirrors are flat mirrors.

10. The system as recited in claim 3, wherein the two horizontally oriented mirrors are curved in one or both of a horizontal dimension and a vertical dimension.

11. The system as recited in claim 3, wherein the two horizontally oriented mirrors are segmented mirrors, wherein each segmented mirror includes a center mirror segment that reflects a center portion of the FOV to one or more center cameras, a left mirror segment angled to the left with respect to the center mirror segment that reflects a left portion of the FOV to one or more left cameras, and a right mirror segment angled to the right with respect to the center mirror segment that reflects a right portion of the FOV to one or more right cameras.

12. The system as recited in claim 1, wherein the two or more mirrors and the two or more cameras are components of a head-mounted display (HMD).

13. A system, comprising:
a display panel;
two horizontally oriented mirrors that reflect light from a scene;
two or more cameras each configured to capture a portion of the light from the scene reflected by the mirrors; and
one or more processors configured to:
obtain images of respective portions of the scene captured by the two or more cameras;
process the images to generate at least one composite image of the scene; and
output the at least one composite image to the display panel,
wherein a first horizontally oriented mirror is tilted towards a first camera and a second horizontally oriented mirror is tilted towards a second camera, and wherein the first and second cameras are located at opposite sides of the mirrors.

14. The system as recited in claim 13, wherein a first horizontally oriented mirror is tilted to reflect light from a top portion of the scene to one or more of the cameras that capture images of a top portion of the scene, and wherein a second horizontally oriented mirror is tilted to reflect light from a bottom portion of the scene to one or more of the cameras that capture images of a bottom portion of the scene.

15. The system as recited in claim 13, wherein the system comprises at least four cameras facing the two horizontally oriented mirrors, with at least two cameras facing the first mirror to capture left and right portions of the top portion of the scene, and at least two cameras facing the second mirror to capture left and right portions of the bottom portion of the scene.

16. The system as recited in claim 13, wherein the two mirrors connect at a front edge, and are tilted downwards with respect to a center axis of the system.

17. The system as recited in claim 13, wherein each mirror covers between 40 and 50 degrees of a field of view in the vertical direction.

18. The system as recited in claim 13, wherein the two horizontally oriented mirrors are flat mirrors.

19. The system as recited in claim 13, wherein the two horizontally oriented mirrors are curved in one or both of a horizontal dimension and a vertical dimension.

20. The system as recited in claim 13, wherein the two horizontally oriented mirrors are segmented mirrors, wherein each segmented mirror includes a center mirror segment that reflects a center portion of the scene to one or more center cameras, a left mirror segment angled to the left with respect to the center mirror segment that reflects a left portion of the scene to one or more left cameras, and a right mirror segment angled to the right with respect to the center mirror segment that reflects a right portion of the scene to one or more right cameras.

21. The system as recited in claim 13, wherein the display, mirrors, and cameras are components of a head-mounted display (HMD).

* * * * *